R. J. J. MUELLER & E. G. ROWLANDS.
WATER ELECTROLYZING APPARATUS.
APPLICATION FILED MAR. 21, 1913.

1,219,843.

Patented Mar. 20, 1917.
3 SHEETS—SHEET 2.

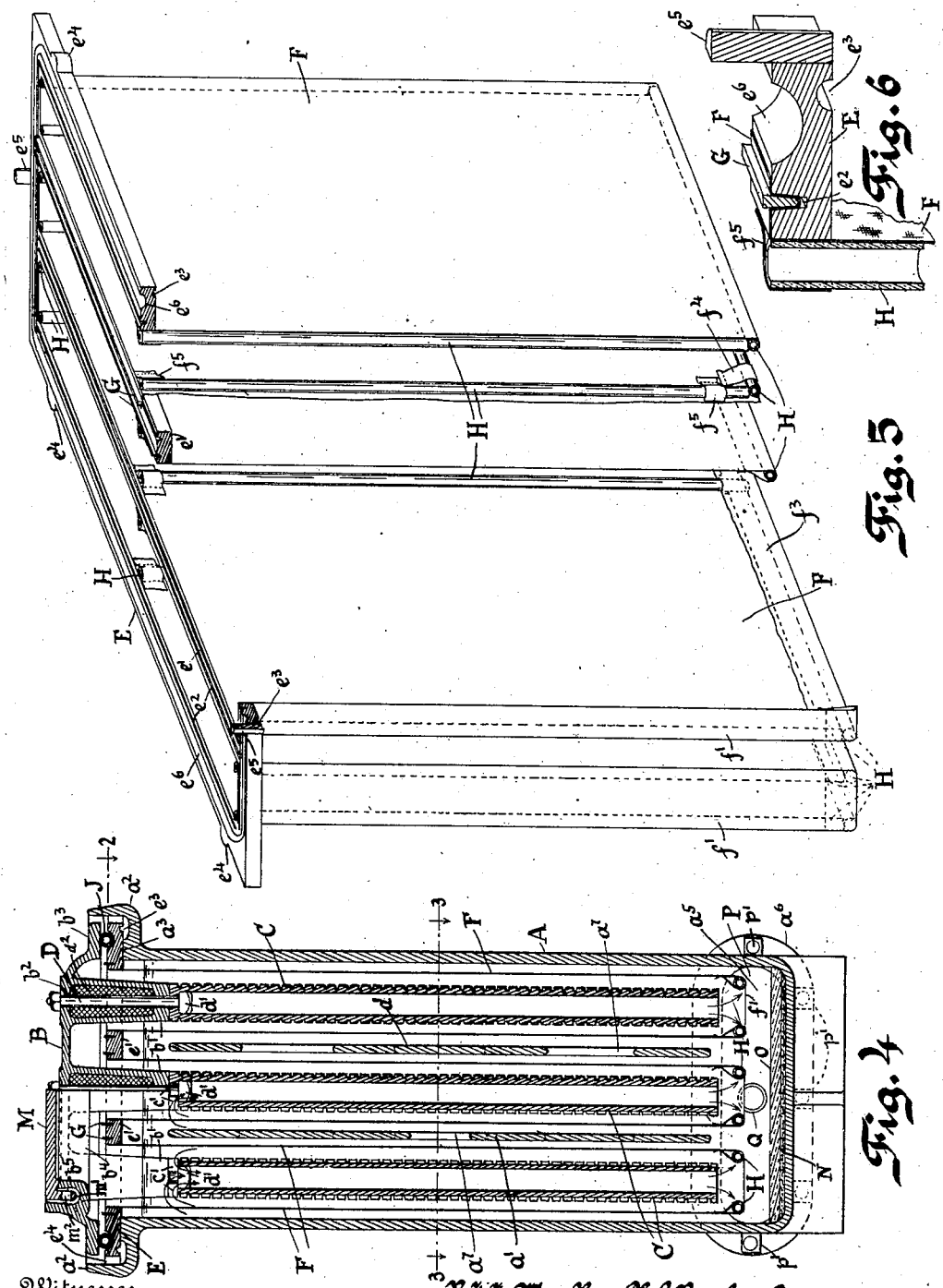

UNITED STATES PATENT OFFICE.

RUDOLPH JACOB JOHANNES MUELLER, OF CHICAGO, ILLINOIS, AND ERROLL GODDARD ROWLANDS, OF MILWAUKEE, WISCONSIN, ASSIGNORS TO UNIVERSAL OXYGEN COMPANY, A CORPORATION OF WISCONSIN.

WATER-ELECTROLYZING APPARATUS.

1,219,843. Specification of Letters Patent. Patented Mar. 20, 1917.

Application filed March 21, 1913. Serial No. 755,886.

*To all whom it may concern:*

Be it known that we, RUDOLPH JACOB JOHANNES MUELLER and ERROLL GODDARD ROWLANDS, of Chicago, Illinois, and Milwaukee, Wisconsin, respectively, have invented a Water-Electrolyzing Apparatus, of which the following is a specification.

This invention relates to devices for producing hydrogen and oxygen gas from water by electrolysis; and our object is to produce an improved practical form of cell for that purpose.

More particularly we aim, first, to provide means for evolving the hydrogen and oxygen with a minimum of electric resistance; secondly, to provide means for separating and keeping separate the evolved hydrogen from the oxygen; thirdly, to provide automatic means for producing and maintaining circulation of the electrolyte whereby the strength thereof will be kept uniform throughout; fourthly, to provide means for cleaning and removing any deposit on the bottom of the cell; fifthly, to provide convenient means for sealing the cell to prevent the escape of the gases evolved therein; sixthly, to provide an improved disposition of the positive and negative electrodes; seventhly, to provide an improved form of positive electrode and means for electrically connecting the same with the positive terminal; and eighthly, to provide a safety-cover adapted to release internal pressure in case the latter rises above a predetermined point; and finally and generally, we aim to improve the construction and operation and to increase the efficiency of apparatus of this class.

The invention consists in the construction, arrangement and combination of parts as hereinafter particularly described and pointed out in the claims.

In the accompanying drawing like characters designate the same parts in the several figures.

Figure 1:
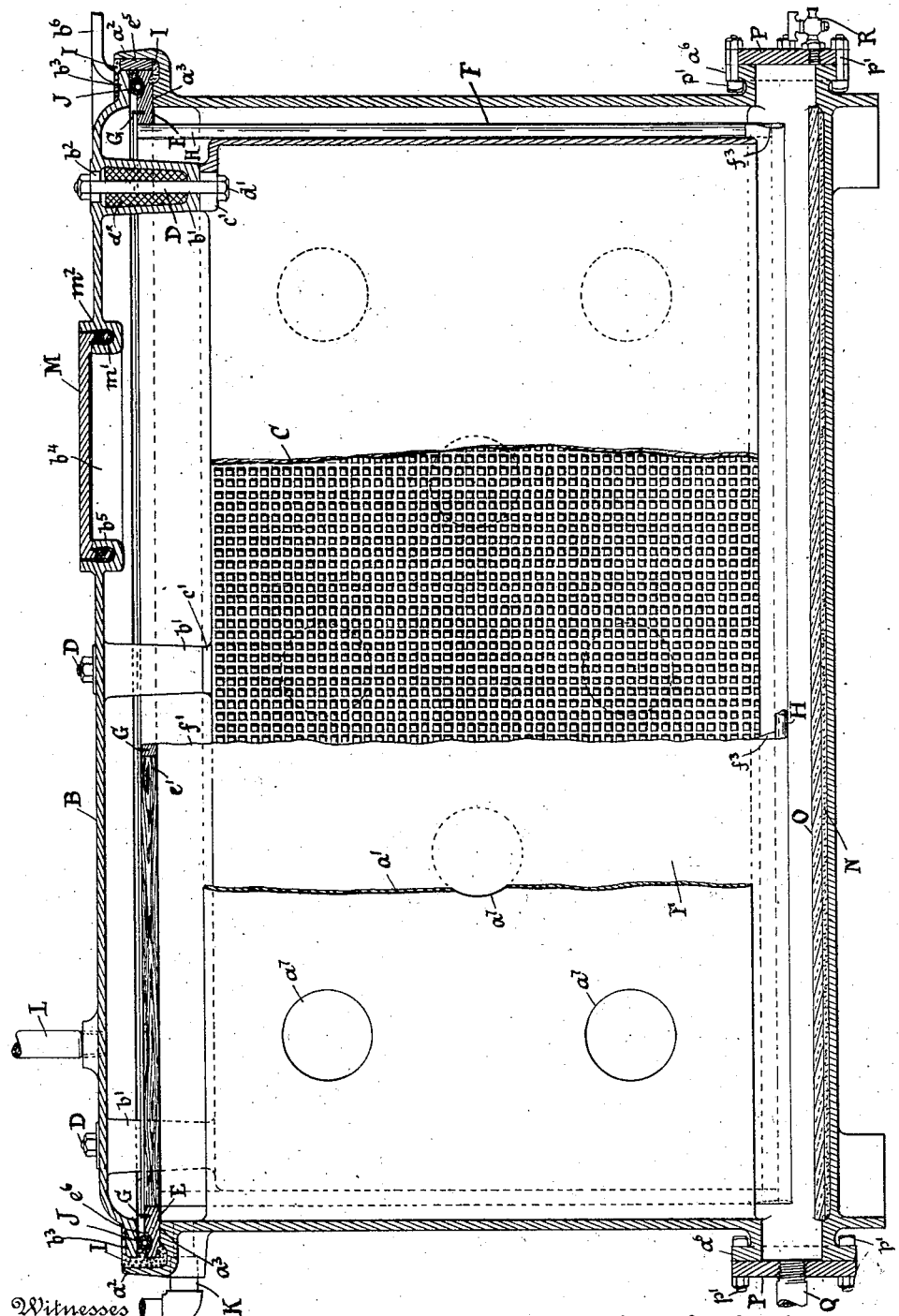
Figure 2:
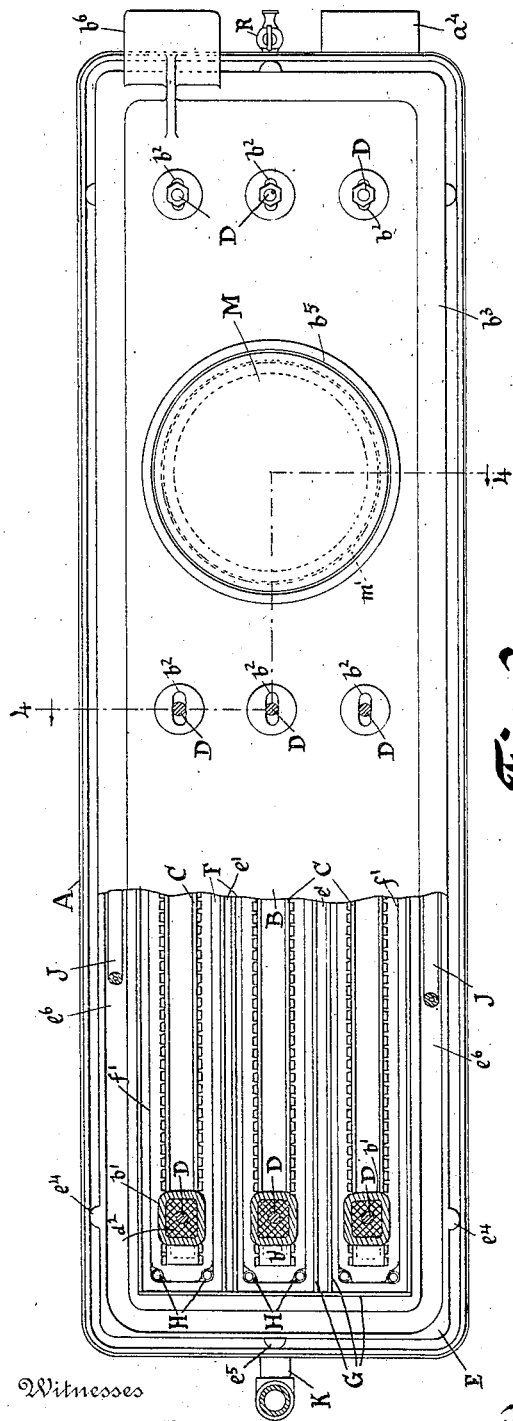
Figure 3:
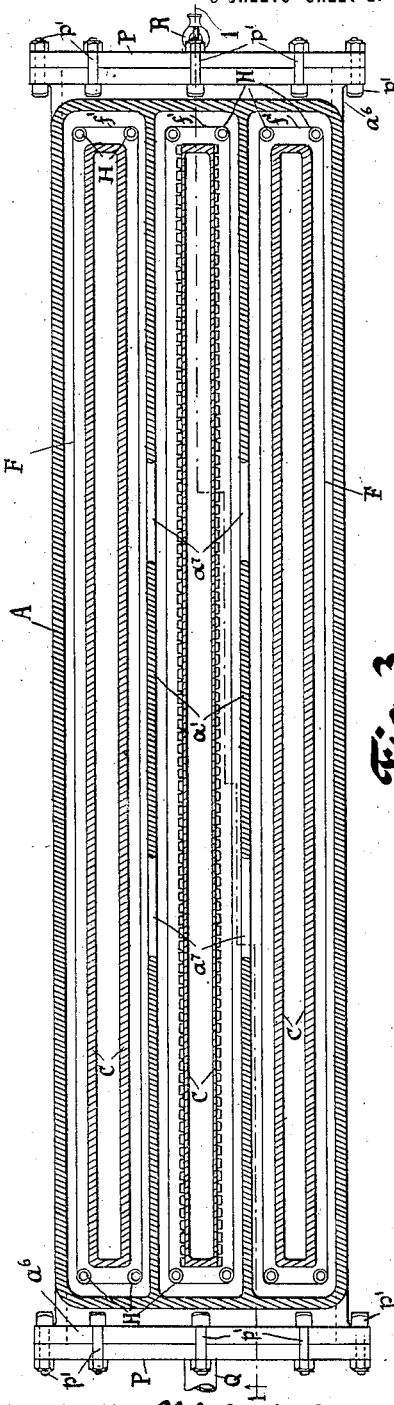

Figure 1 is a vertical longitudinal section on the line 1—1, Fig. 3, through a cell made in accordance with our invention; Fig. 2 is a plan view of the cell, the left-hand end thereof being shown with the cover removed and the depending portions of said cover in section on the line 2—2, Fig. 4; Fig. 3 is a horizontal section of the cell on the line 3—3, Fig. 4; Fig. 4 is a vertical cross section on the line 4—4, Fig. 2; Fig. 5 is a perspective view of the diaphragms and diaphragm frame, portions thereof being broken away; and Fig. 6 is a sectional perspective view on a larger scale of a small portion of one side of the diaphragm frame.

The cell as illustrated comprises a cast-metal (ordinarily iron) tank or vessel A, which acts also as the negative element, and has disposed longitudinally thereof a number of webs or plates $a'$, which are parallel to the sides and form additional surfaces for the conduction of current and evolution of gas in the manner hereinafter described. The tank A is open at the top and is provided with a cover or closure-member B, this cover-member being separated electrically from the tank A and constituting the base or distributing element of the positive pole for the electric current. It is provided with a plurality of depending hollow lugs $b'$, which are perforated longitudinally to receive bolts D, adapted to secure the positive electrodes C to the cover in electric and depending relation thereto. The lugs $b'$ are of course arranged in parallel rows longitudinally of the cover, preferably three to each row as shown, and with as many rows from one side to the other as there are electrodes. Herein three positive electrodes C are shown, disposed intermediately in the spaces formed between the walls of the tank A and the plates $a'$ thereof, as will clearly appear from Figs. 3 and 4. The form of the electrodes is important, as it forms a special feature of our invention. The electrodes C are tubular structures closed at the sides and ends and open at top and bottom, and having overhanging lugs or projections $c'$ at the top to engage the heads $d'$ of the bolts D. This structure is for the purpose of producing an automatic circulation, as will be hereinafter described. The external faces of each element C facing the side walls of the tank A or plates $a'$ are preferably provided as shown, with a plurality of intercrossing grooves which form projecting squares, thus largely increasing the available surface of contact with the electrolyte. These projections are, however, not essential to our invention, and are omitted from two of the positive electrodes in Fig. 3.

It will be noted that the cover B immediately over the lugs $b'$ is slotted, as shown at $b^2$, giving a range of longitudinal adjustment of the bolts and also giving access to the interior of the lug around the bolt, and when the electrodes are ready to be attached to the cover and the bolts D are in place, the hollow space inside the lug is filled, as shown at $d^2$, with some solid material poured into said space in melted condition so as to seal the lug positively against egress of gas. For this purpose we may use an insulator such as paraffin, but we prefer to use lead or solder as this assists the electrical connection.

In addition to the positive and negative electrodes it is also necessary to provide some means of keeping the evolved gases separate, and such means in our invention consist of one or more diaphragms of non-metallic woven fabric, but within the limits of our invention other substances may be used, as for example, treated felt, asbestos, etc. The electrolyte, which is ordinarily a caustic-soda solution, makes it necessary that whatever material is used shall be proof against corrosive action by such solution, and to this end, we prefer to treat the fabric with paraffin or like substance in sufficient quantity to inclose the individual fibers without filling up the meshes between them, thereby protecting the material while still leaving an open work through which the current can pass, and to this end an open weave of fabric is preferable, the only limit of size of meshes being that which will prevent any possible mingling of the gases evolved on the positive and negative electrodes. This diaphragm material is arranged to completely inclose each positive electrode on the sides and ends, for the purpose hereinafter named, and to this end we arrange a rectangular frame E, which may be made of wood or otherwise electrically insulated from the tank A and cover B, and is provided with as many longitudinal intermediate bars $e'$ as there are plates $a'$. This frame forms between each pair of adjacent side-bars and intermediate bars, an opening for a rectangular pocket or tubular diaphragm $f'$ of the diaphragm-material F, this pocket or diaphragm having an open bottom.

The upper edge of each diaphragm $f'$ is folded over upon the top face of the frame E, and is secured in place thereto by means such as a tapered strip G, which fits in a tapered groove $e^2$, between the side of which and the strip, the material is caught. In Fig. 5 only two of the strips G are shown, those on the intermediate broken bar $e'$, to avoid confusion of the lines of the drawing. It should be understood that the end-bars of the frame E are in like manner provided with grooves $e^2$ and strips G. The upper portion of each diaphragm $f'$, wherever it extends above the surface of the electrolyte and for a short distance below such surface, is thoroughly impregnated with some hermetic sealing material such as paraffin, shellac or rubber paint, and the edges of the cloth sealed to the frame therewith, as this portion of the diaphragm serves as a separating partition between the two spaces in which the two gases accumulate, that for the oxygen gas being on the under side of the bell-shaped cover B, and that for the hydrogen gas on the under side of the frame E.

In order to hold the flexible material of the diaphragms $f'$ in correct relation to the electrodes and midway between the positive and negative surfaces, we provide rigid elements at the corners and along the bottom edges of each diaphragm. Such elements may consist of metal-wire or any available material, but we have herein shown, as being preferable, glass rods or tubes H, which are secured in place along the bottom edges of the diaphragm by a hem $f^3$ or strap $f^4$, and the vertical tubes H are supported in place by straps $f^5$ or similar devices sewed to the cloth. It will be seen that the dimensions of these tubes are such as to bear against the positive electrodes at the edges thereof, which hold the diaphragm in its place and keep it stretched taut so that it does not come into contact with the surface of either electrode.

The tank A is provided at the top with a rectangular flange or channel $a^2$, on the inner edge of which is a plane face $a^3$, which serves as a rest for the margin of the frame E; but said margin projects out beyond said face $a^3$ and overhangs the bottom of the channel $a^2$ at a distance therefrom. This provides for the introduction of a sealing-material, such as paraffin I, which can be poured into the trough $a^2$ to seal the frame E in place, as illustrated in Fig. 1; and to assist in perfecting the seal the frame E has a semi-circular groove $e^3$ around its edge on the bottom side. The edge of the frame E lies at a distance from the side of the trough $a^2$ and is centered with respect thereto by a plurality of projections $e^4$, $e^5$, located at intervals on its sides and ends. The projections $e^5$ on the ends of the frame E extend above the frame, so as to center also the cover B and keep it out of electric contact with the tank A; but such projections are unnecessary on the sides, because the cover-member B is accurately centered laterally by means of the glass tubes H.

The cover B has a horizontal flange $b^3$ around its edge which overlies the frame E and rests upon a compressible gasket J, which is seated in a semicircular groove $e^6$ around the edge on the top face of the frame E. It will be seen that the oxygen-chamber is sealed by the same paraffin I, which seals the hydrogen-chamber, being poured into the trough until it is full.

The frame E with the sealing material I and gasket J, thus insulate the tank A and cover B from each other and from the diaphragm $f'$, and with the diaphragms hermetically separate the gas collecting chambers or spaces above and below said frame from each other. Since the diaphragm supporting frame E is electrically inactive and insulates the diaphragm $f'$ from both sets of electrodes, it may be regarded and designated as a neutral section or element of the cell.

Exit-conduits K and L are provided near the top of the tank A and in the cover B, through which the hydrogen and oxygen respectively are conducted off to the storage-reservoirs or place of use.

The cover B is also provided with a safety-cover M, against excessive pressure, this cover closing a circular opening $b^4$ in the cover and having around its edge a flange $m'$, which depends into an annular trough $b^5$ formed around the opening $b^4$. This trough can be filled with paraffin, this constituting a gas-seal, and also increasing by its friction the gas-pressure necessary to raise the cover M and break the seal, and the necessary pressure can be still further increased by forming transverse holes $m^2$ in the flange $m'$ into which the paraffin flows and forms an integral cast with that in the trough $b^5$. The trough $b^5$ is made larger at the bottom than at the top so as to hold the paraffin in place. Of course other substances besides paraffin can be used.

On the right-hand end of the tank A and cover B respectively, are formed ears $a^4$ and $b^6$ for connecting the wires of the electric circuit which supplies the electric current to the cell.

It should be particularly observed that the plates $a'$ and electrodes C do not extend to the bottom of the cell, but leave a clear space next to the bottom. This is essential to the correct operation of the cell, because the electrolyte tends to condense toward the bottom of the cell until finally the solid elements in solution crystallize out therefrom, and such crystals, if they connected the bottom of the cell with the positive electrode, would form a short circuit. Furthermore, any current passing between the bottom of the cell and the positive electrode would produce hydrogen gas which would pass through the bottom of the diaphragm into the oxygen space above. To prevent this from taking place, and also to give ample room for any crystals to separate without affecting the action of the cell, we provide the open space $a^5$ in the lower part of the tank A, and the bottom of the tank is coated with a layer of paraffin N, and upon this is laid a glass plate O. This insulates the bottom of the cell and also provides a smooth surface from which any crystals or other solids accumulating can be readily removed. Furthermore, at each end the tank A is provided with a flanged cleaning-hole $a^6$, covered by a plate P, which is secured thereto by bolts $p'$. One of these plates P is perforated with a threaded aperture to receive the water-supply pipe Q and the other one has a threaded aperture into which the drain-cock R is screwed.

When it is desired to clean the cell, it is only necessary to empty it through the drain-cock R and then remove the plates P, and thereupon the bottom is immediately open for the application of a brush, hoe or scraper, which can be passed through from end to end, and any accumulations removed, and this is done without in any way disturbing the mounting of the cell above.

When the cell is in operation it will be understood of course, that large volumes of hydrogen and oxygen gases are rising from the opposed faces of the negative and positive electrodes, and these form bubbles which lighten the effective specific gravity of the liquid between the opposed faces and tend to carry it upward with the gases, while on the other hand the liquid which is within the walls of each positive electrode, which walls must be close together, is quiescent and therefore has a normal effective specific gravity. The result is that the liquid on the outside is carried up and over into the space inside the positive electrodes, as shown by the arrows in Fig. 4, and the liquid then descends and issues at the bottom of the electrode, thus keeping up an active circulation of electrolyte and preventing the condensing thereof at the bottom of the cell. As a small part of the oxygen may at times be carried down with the circulation in the form of minute globules which, if permitted to do so, might mingle with the hydrogen on the outside of the diaphragms, the bottom of each diaphragm must be lower than both positive and negative electrodes so that the globules of gas will not be carried below the bottom of the diaphragm and rise into the hydrogen-chamber below the frame E.

To equalize the circulation, holes $a^7$ are formed in the plates $a'$ and constitute an important part of our invention.

Various changes and modifications in the constructions as herein shown may be made without departing from the spirit of our invention as defined in the following claims.

We claim:

1. A water electrolyzing cell comprising a metal tank forming an electrode of one polarity, a metal cover for said tank provided with an electrode of opposite polarity depending therefrom into the tank, an insulating diaphragm support interposed between the tank and cover, and a tubular diaphragm secured to said support and surrounding the electrode depending from the cover.

2. A water electrolyzing cell comprising a metal tank provided with a longitudinal partition forming with the sides of the tank electrodes of one polarity, a cover for the tank provided with electrodes of opposite polarity depending therefrom between and alternating with the sides and partition of the tank, an insulating diaphragm support interposed between the tank and cover, and tubular diaphragms secured to said support and surrounding the electrodes depending from the cover.

3. A water electrolyzing cell comprising a metal tank provided with a longitudinal partition parallel with its sides and forming therewith electrodes of one polarity, an arched cover for the tank, electrodes of opposite polarity consisting of metal plates suspended by electric conducting connections from the cover between and parallel with the sides and partition of the tank, an insulating diaphragm support interposed between the cover and tank and provided with depending diaphragms forming gas conduits, and sealing packing between the tank, cover and diaphragm support which hermetically separates the gas collecting space above from that below it.

4. A water electrolyzing cell comprising a metal tank forming an electrode of one polarity, a metal cover of opposite polarity for the tank, an electrode electrically connected with the cover and depending therefrom into the tank, an insulating diaphragm support interposed between the tank and cover, and a tubular diaphragm of non-corrodible flexible material pervious to liquid and impervious when wet to gas, surrounding the cover electrode.

5. A water electrolyzing cell comprising a metal tank having an outwardly projecting flange at the top and longitudinal partitions forming with the sides electrodes of one polarity, an arched metal cover for the tank having a corresponding flange, an insulating diaphragm support fitting around its margin between the flanges of the tank and cover, metal electrode plates of opposite polarity depending from the cover into the tank through gas conduits in the diaphragm support, and tubular diaphragms surrounding the depending electrodes and sustained by the diaphragm support.

6. In a water-electrolyzing cell, the combination of a tank, parallel electrodes of alternately opposite polarity, those of one polarity being suspended in said tank from above and being each surrounded by a tubular diaphragm of flexible liquid-permeable material, said diaphragm extending above the liquid-level in the tank and forming a septum to separate the gas evolved at the inclosed electrode from the gas evolved at the electrodes of opposite polarity, and being rendered gas-impermeable above the liquid-level, and substantially stretched and held in position upon insulating-bars at the edges which are adapted to be kept apart by the inclosed electrode.

7. In a water-electrolyzing cell, the combination of a tank, alternating electrodes therein, and a diaphragm comprising sheets of liquid permeable material parallel to and midway between adjacent electrodes, said sheets passing above the liquid-level and dividing the gas-space into separate compartments and being rendered impermeable above the liquid level in the tank.

8. In a water-electrolyzing cell, the combination of a metal tank of one polarity provided with electrodes of that polarity, a cover of the opposite polarity and electrodes of that polarity suspended from it between the first-named electrodes and opposite walls of the tank in alternating parallel relation, an insulating frame interposed between said tank and cover and forming a means for electrically separating them one from the other, sealing-devices for preventing the escape of gas around the edges of the tank, cover and frame, said frame having openings therein disposed above the respective electrodes suspended from said cover, and tubular diaphragms suspended from said frame and forming a joint therewith, each diaphragm surrounding one of said suspended electrodes.

9. A water-electrolyzing cell comprising a metal tank forming electrodes of one polarity, a removable metal cover of the opposite polarity, electrodes of the same polarity as the cover suspended therefrom between the tank electrodes in alternating parallel relation to one another, an insulating frame interposed between said tank and cover, and having openings therein above the electrodes suspended from the cover, diaphragms suspended from said frame around the openings therein and the electrodes suspended from the cover and serving with said frame to prevent intermingling of the gases evolved from the electrodes of opposite polarity, and sealing devices for preventing the escape of gas around the edges of the tank, cover and frame.

10. A water-electrolyzing cell comprising a metal tank forming electrodes of one polarity, a removable metal cover of the opposite polarity, electrodes of the same polarity as the cover suspended therefrom between the tank electrodes in alternating parallel relation to one another, an insulating frame interposed between said tank and cover, and having openings therein above the electrodes suspended from the cover, and diaphragms suspended from said frame around the openings therein and the electrodes suspended from the cover and serving with said frame to prevent intermingling of the gases evolved from the electrodes of opposite polarity.

11. In a water-electrolyzing cell, the combination of a metal tank of one polarity provided with electrodes of that polarity, a cover of the opposite polarity and electrodes of that polarity suspended from it between the first-named electrodes and opposite walls of the tank in alternating parallel relation, an insulating frame interposed between said tank and cover and forming a means for electrically separating them one from the other, sealing-devices for preventing the escape of gas around the edges of the tank, cover and frame, said frame having openings therein disposed above the respective electrodes suspended from said cover, and tubular diaphragms suspended from said frame and forming a joint therewith, each diaphragm surrounding one of said suspended electrodes, said diaphragms being of flexible fibrous insulating material and having means for stretching them and spacing them apart from the suspended electrodes at a uniform distance therefrom.

12. In a water-electrolyzing cell, the combination of a metal tank of one polarity provided with electrodes of that polarity, a cover of the opposite polarity and electrodes of that polarity suspended from it between the first-named electrodes and opposite walls of the tank in alternating parallel relation, an insulating frame interposed between said tank and cover and electrically separating them one from the other, sealing devices for preventing the escape of gas around the edges of the tank, cover and frame, said frame having openings therein disposed above the respective electrodes suspended from said cover, and tubular diaphragms suspended from said frame and forming a joint therewith, each diaphragm surrounding one of said suspended electrodes, extending a distance below the same, and being open at the bottom.

13. In a water-electrolyzing cell, the combination of a metal tank of one polarity provided with electrodes of that polarity, a cover of the opposite polarity and electrodes of that polarity suspended from it between the first-named electrodes and opposite walls of the tank in alternating parallel relation, an insulating frame interposed between said tank and cover and electrically separating them one from the other, sealing-devices for preventing the escape of gas around the edges of the tank, cover and frame, said frame having openings therein disposed above the respective electrodes suspended from said cover, and tubular diaphragms suspended from said frame and forming a joint therewith, said diaphragms consisting of material which is permeable to the electrolyte below the liquid-level in the tank, and impervious to gas above said level, and each diaphragm surrounding one of the suspended electrodes.

14. In a water-electrolyzing cell, the combination of a metal tank of one polarity provided with electrodes of that polarity, a cover of the opposite polarity and electrodes of that polarity suspended from it between the first-named electrodes and opposite walls of the tank in alternating parallel relation, an insulating frame interposed between said tank and cover and electrically separating them one from the other, sealing-devices for preventing the escape of gas around the edges of the tank, cover and frame, said frame having openings therein disposed above the respective electrodes suspended from said cover, tubular diaphragms suspended from said frame and forming a joint therewith, said diaphragms being of flexible fibrous material, and rods of insulating material mounted on the edges thereof and adapted to hold them apart from the suspended electrodes and at a uniform distance therefrom, and each diaphragm surrounding one of the suspended electrodes.

15. A water-electrolyzing cell comprising, in combination with a metal tank the sides of which form electrodes of one polarity and which is provided with parallel metal plates forming additional electrodes of the same polarity, a metal cover of the opposite polarity, a second set of electrodes of the same polarity as said cover and suspended therefrom in parallel relation to and alternating with the first-named electrodes, a frame of insulating material interposed between said tank and cover and separating them electrically, diaphragms suspended from said frame, separating the electrodes of one polarity from those of the opposite polarity and forming two hermetically separated gas-chambers, and a hermetic seal of liquefiable insulating material surrounding the edges of said tank, cover and frame.

16. A water-electrolyzing cell comprising in combination with a metal tank the sides of which form electrodes of one polarity and which is provided with parallel metal plates forming additional electrodes of the same polarity, a metal cover of the opposite polarity, a second set of electrodes of the same polarity as the electrodes of said cover suspended therefrom in parallel relation to and alternating with the first-named electrodes, a frame of insulating material interposed between said tank and cover and separating them electrically, diaphragms suspended from said frame, separating the electrodes of one polarity from those of the opposite polarity and forming two hermetically separated gas-chambers, said tank having an L-shaped flange extending around its upper edge and forming with the edges of said frame and cover a trough for liquid-sealing material, and a hermetic seal consisting of liquefiable insulating material filling said trough.

17. In a water-electrolyzing cell, an electrode of substantially tubular form comprising two parallel plates whose outer surfaces are electrolytic, said plates being spaced apart to form a passage from top to bottom and open at top and bottom, an electrode of opposite polarity surrounding the first-named electrode, and a substantially tubular liquid permeable diaphragm open at the bottom and inclosing the walls of the tubular electrode and spaced therefrom to permit a liquid electrolyte to flow downward through the tubular electrode from top to bottom and thence upward through the space between the tubular diaphragm and walls of said electrode.

18. A water-electrolyzing cell comprising in combination a metal tank forming an electrode of one polarity, an electrode of opposite polarity suspended in said tank, said last-named electrode being hollow and open at top and bottom whereby the electrolyte is caused to circulate downwardly through the interior space thereof without disturbance from the active portion of the electrolyte outside of said electrode, and a tubular diaphragm, which is liquid-permeable below and gas-impermeable above the liquid level in the tank, inclosing said suspended electrode and extending below the bottom thereof.

19. A water-electrolyzing cell comprising in combination a metal tank forming an electrode of one polarity, an electrode of opposite polarity suspended in the tank, said last-named electrode being hollow and open at top and bottom whereby the electrolyte is caused to circulate downwardly through the interior space thereof without disturbance from the active portion of the electrolyte outside of said electrode, and a tubular diaphragm of flexible material, which is liquid-permeable below and gas-impermeable above the liquid level in the tank, inclosing said suspended electrode and extending below the bottom thereof, together with insulating-bars carried by said tubular diaphragm and holding it at a uniform distance from said suspended electrode.

20. In a water-electrolyzing cell, the combination of a frame having one or more openings, a diaphragm suspended in each opening, and means for hermetically securing the diaphragm to the frame comprising a groove in the frame around the top of the opening and strips fitting in said groove and adapted to bind the edge of the diaphragm in the groove.

21. In a water-electrolyzing cell, the combination of a tank and a cover sealed thereon and having an opening and a safety-cover closing said opening; said opening having formed around it a trough and said safety-cover having a flange depending into said trough when it is in place; and liquefiable material filling said trough and adapted to hold said cover in place against pressure.

22. In a water-electrolyzing cell, the combination of a tank and a cover sealed thereon and having an opening and a safety-cover closing said opening; said opening having formed around it a trough and said safety-cover having a flange depending when it is in place into said trough; and liquefiable material filling said trough and adapted to hold said cover in place against pressure, said flange on said cover having a plurality of holes into which said liquefiable material is adapted to flow and thereby form an interlock with said cover.

23. In a water-electrolyzing cell, the combination of a tank and a cover sealed thereon and having an opening and a safety-cover closing said opening; said opening having formed around it a trough and said safety-cover having a flange depending when it is in place into said trough; and liquefiable material filling said trough and adapted to hold said cover in place against pressure, said trough being wider at the bottom than at the top, whereby it forms an interlock with said liquefiable material.

24. In a water-electrolyzing cell, the combination of a tank, electrodes suspended therein above the bottom of said tank leaving a clear space between the bottom of the tank and the bottom of the electrodes extending the entire length of the tank, said tank having covered apertures at the ends whereby any material accumulating on the bottom of the tank may be removed by means of a brush or stream of water introduced through one of said apertures, and means at the lower ends of the electrodes to prevent intermingling of evolved oxygen and hydrogen gases.

25. In a water-electrolyzing apparatus the combination of a tank, a metal cover closing the same at the top and having vertically perforated lugs, one or more electrodes having upright suspending rods extending through said lugs and secured in place upon the outside of said cover, said lugs inclosing a space surrounding said rods, and a liquefiable material filling said space and hermetically sealing the openings through said lugs.

26. In a water-electrolyzing apparatus, the combination of a tank, a metal cover closing the same at the top and having depending vertically perforated lugs, one or more electrodes having upright suspending rods extending through said lugs and secured in place upon the outside of said cover, said lugs inclosing spaces around said rods, and liquefiable metal filling said spaces and forming hermetic seals and electrical connections between the rods and the cover.

27. A water-electrolyzing cell comprising in combination a metal tank having one or more parallel longitudinal webs formed integrally with it, the whole constituting a plurality of connected electrodes of one polarity; a metal cover of the opposite polarity closing said tank at the top; an insulating frame interposed between said tank and cover and having openings therein above the open spaces between said electrodes; sealing-means forming hermetic joints between said tank, frame and cover; tubular diaphragms suspended in the openings of said frame, hermetically secured thereto and impervious to gas above and pervious to liquid below the electrolyte level in the tank; and hollow electrodes suspended within the diaphragms from and electrically connected with the cover, and open at the top and bottom whereby circulation of the electrolyte through them is induced, the exterior surfaces only of said electrodes being electrically active, the tank having at each end adjacent to the bottom an opening provided with a removable cover and the inside electrodes being separated from the bottom of the tank by a clear space between said openings, whereby a cleaning-device may traverse the bottom of the tank its entire length to remove any accumulated material therefrom without disturbing the hollow electrodes and diaphragms.

28. A water-electrolyzing cell, comprising in combination a metal tank having one or more parallel longitudinal webs formed integrally with it, the whole constituting a plurality of connected electrodes of one polarity; a metal cover of the opposite polarity closing said tank at the top; an insulating frame interposed between said tank and cover and having openings therein above the open spaces between said electrodes; sealing-means forming hermetic joints between said tank, frame and cover; tubular diaphragms suspended in the openings of said frame, hermetically secured thereto and impervious to gas above and pervious to liquid below the electrolyte level; and hollow electrodes suspended within the diaphragms from and electrically connected with the cover and open at the top and bottom whereby circulation of the electrolyte through them is induced, the exterior surfaces only of said electrodes being electrolytically active, said tank having at each end adjacent to the bottom an opening provided with a removable cover, and the inside electrodes being separated from the bottom of the tank by a clear space between said openings whereby a cleaning-device may traverse the bottom of the tank its entire length to remove any accumulated material therefrom without disturbing said electrodes and diaphragms, said diaphragms extending below the suspended electrodes and the bottom of the tank being covered by an insulating-plate whereby gas of the wrong polarity is prevented from entering the diaphragms.

In witness whereof we have hereunto set our hands in the presence of two witnesses.

RUDOLPH JACOB JOHANNES MUELLER.
ERROLL GODDARD ROWLANDS.

Witnesses:
LAWRENCE CONLAN,
JESSIE GUSENFELD.